United States Patent Office 3,657,358
Patented Apr. 18, 1972

3,657,358
COMPOUNDS 2,4 - DICHLORO - 3 - METHOXY-6-NITROPHENOL, 2,6-DICHLORO - 3 - METHOXY-4-NITROPHENOL AND THEIR ALKALI METAL SALTS
Earl G. Alley and Richard Garth Pews, Midland, Mich., assignors to The Dow Chemical Company, Midland, Mich.
No Drawing. Filed Aug. 14, 1969, Ser. No. 850,214
Int. Cl. C07c 43/28
U.S. Cl. 260—613 D                               4 Claims

ABSTRACT OF THE DISCLOSURE

The new compounds 2,4-dichloro-3-methoxy-6-nitrophenol, 2,6-dichloro-3-methoxy-4-nitrophenol and their alkali metal salts are prepared by alkali hydrolysis in aqueous methanol of 2,3,4,5-tetrachloronitrobenzene. These compounds have been discovered to be active herbicides, fungicides and insecticides.

BACKGROUND OF THE INVENTION

Katsumara in Nippon Kaguku Zusshi, 79, 1323 teaches the preparation of 2-chloro-4-nitro-5-methoxyphenol and 2-nitro-4-chloro-5-methoxyphenol by reacting 2,4,5-trichloronitrobenzene with a solution of sodium hydroxide in aqueous methanol.

SUMMARY OF THE INVENTION

The present invention is the new compounds 2,4-dichloro-3-methoxy-6-nitrophenol, 2,6-dichloro-3-methoxy-4-nitrophenol and their alkali metal salts. Such compounds are active herbicides, fungicides and insecticides.

The compounds of the present invention are conveniently prepared by reacting 2,3,4,5-tetrachloronitrobenzene with a solution of an alkali metal hydroxide, preferably sodium or potassium hydroxide, in aqueous methanol. The product of such reaction is a mixture of essentially two alkali metal phenolates: the 2,4-dichloro-3-methoxy - 6 - nitrophenolate and the 2,6 - dichloro-3-methoxy-4-nitrophenolate. These alkali metal salts may easily be converted to the corresponding phenol compound by reacting them with a strong acid.

The compounds of the present invention are active pre-emergence and post-emergence herbicides against such plants as pig weeds, beans, wild oats, yellow foxtail, cotton, sorghum, binderweed and barnyard grass. In addition, the compounds show activity as bactericides and fungicides against *Staphylococcus aureus*, *Aspergillus terreus* and *Microbacterium phlei*. The compounds are also active insecticides against the southern army worm and the two spotted spider mite.

SPECIFIC EMBODIMENTS

EXAMPLE 1

Preparation of potassium 2,4-dichloro-3-methoxy-6-nitrophenolate and potassium 2,6-dichloro-3-methoxy-4-nitrophenolate To a stirred solution of 70 g. of potassium hydroxide, 200 ml. of methanol and 200 ml. of water at room temperature, 10 g. of 2,3,4,5-tetrachloronitrobenzene was added. The mixture was heated to the boiling point and held at the boiling point for 30 minutes. When reaction mixture was cooled, the solid formed was removed by filtration. 7.8 grams of orange crystals were recovered for a yield 72% based on the starting tetrachloronitrobenzene. Upon heating, a portion of the crystals decomposed at 330° C. The crystals were analyzed by elemental analysis and infrared spectroscopy and were determined to be a mixture containing 75% potassium 2,4-dichloro-3-methoxy-6-nitrophenolate and 25% of potassium 2,6-dichloro-3-methoxy-4-nitrophenolate.

EXAMPLE 2

Preparation of the phenol compound corresponding to the potassium 2,4-dichloro-3-methoxy-6-nitrophenolate To 100 mg. of recrystallized potassium 2,4-dichloro-3-methoxy-6-nitrophenolate, 10 ml. of concentrated hydrochloric acid was added, and the mixture formed was stirred for 15 minutes. The precipitate was dissolved in hexane, the hexane layer was separated from the aqueous acid and the hexane was evaporated. Fluffy yellow crystals were obtained that weighed 0.04 g. and had a melting point of 102° C. The product was identified by elemental analysis and by infrared spectroscopy to be 2,4-dichloro-3-methoxy-6-nitrophenol.

EXAMPLE 3

Pre-emergence herbicide test

Seeds were planted in potted soil just prior to treatment with the compounds of the invention and the known compound, 4-chloro-5 - methoxy-2-nitrophenol. An aqueous dispersion of the compound to be tested was then applied in an amount that would give a concentration 20 lb./acre except for the potassium derivative which was tested at 10 lb./acre. The seeded pot was then maintained in the greenhouse under normal variable conditions of temperature and humidity and was watered as necessary. After two weeks final readings were taken noting the percent of the seeds that did not grow or the percent of the plants that were dead after an initial growth as compared to untreated seeds. The results of treatment with the compounds of the invention compared to the known compound are shown in Table I.

TABLE I.—HERBICIDE ACTIVITY

| | Percent kill | | | |
|---|---|---|---|---|
| Seed planted | 2,4-dichloro [a] | 2,6-dichloro [b] | K 2,4-dichloro [c] | 4-chloro [d] |
| Pig weed | 100 | 100 | 100 | 0 |
| Wild mustard | 100 | 90 | (e) | (e) |
| Bindweed | 100 | 100 | (e) | (e) |
| Beans | 80 | 30 | 0 | 20 |
| Wild oats | 80 | 30 | 0 | 0 |
| Yellow foxtail | 100 | 70 | (e) | (e) |

[a] 2,4-dichloro-3-methoxy-6-nitrophenol.
[b] 2,6-dichloro-3-methoxy-4-nitrophenol.
[c] Potassium 2,4-dichloro-3-methoxy-6-nitrophenol.
[d] 4-chloro-5-methoxy-2-nitrophenol.
[e] No data.

In the same manner as shown in Example 1, sodium hydroxide or another alkali metal hydroxide may be reacted in aqueous methanol solution with 2,3,4,5-tetrachloronitrobenzene to produce the corresponding alkali metal 2,4-dichloro-3-methoxy-6-nitrophenolates and 2,6-dichloro-3-methoxy-4-nitrophenolates. Such phenolates then may be reacted with a strong acid such as HCl to form the corresponding free phenols. Small amounts of any of the compounds may be applied to plants such as pig weed as an effective pre-emergence or post-emergence herbicide.

We claim:

1. The new compounds 2,4-dichloro-3-methoxy-6-nitrophenol, 2,6-dichloro-3-methoxy-4-nitrophenol and their respective alkali metal salts.

2. The new compound of claim 1 2,4-dichloro-3-methoxy-6-nitrophenol.

3. The new compound of claim 1 2,6-dichloro-3-methoxy-4-nitrophenol.

4. The compounds of claim 1 wherein the salt is the sodium or potassium salt.

References Cited

Kohn, Jour. Amer. Chem. Soc., vol. 7 (1952) pp. 1601–1602.

BERNARD HELFIN, Primary Examiner

U.S. Cl. X.R.

71—122; 260—999